US012317040B2

(12) United States Patent
Manley et al.

(10) Patent No.: US 12,317,040 B2
(45) Date of Patent: May 27, 2025

(54) ELECTRICAL CABLE ASSEMBLY FOR EAR-WORN HEARING DEVICES

(71) Applicant: KNOWLES ELECTRONICS, LLC, Itasca, IL (US)

(72) Inventors: Matthew Manley, Crystal Lake, IL (US); Randall A. Sanecki, Huntley, IL (US)

(73) Assignee: KNOWLES ELECTRONICS, LLC, Itasca, IL (US)

( * ) Notice: Subject to any disclaimer, the term of this patent is extended or adjusted under 35 U.S.C. 154(b) by 236 days.

(21) Appl. No.: 18/148,461

(22) Filed: Dec. 30, 2022

(65) Prior Publication Data

US 2024/0223975 A1 Jul. 4, 2024

(51) Int. Cl.
*H04R 25/00* (2006.01)
*H01B 7/40* (2006.01)

(52) U.S. Cl.
CPC ............ *H04R 25/609* (2019.05); *H01B 7/40* (2013.01); *H04R 25/604* (2013.01); *H04R 25/656* (2013.01); *H04R 2225/0216* (2019.05); *H04R 2225/57* (2019.05)

(58) Field of Classification Search
CPC .......... H04R 25/609; H04R 2225/0216; H04R 2225/57; H01B 7/40
See application file for complete search history.

(56) References Cited

U.S. PATENT DOCUMENTS

2022/0312133 A1* 9/2022 Tamsiran ............... H04R 25/65
2023/0010610 A1* 1/2023 Paynter ................ H01R 24/564

FOREIGN PATENT DOCUMENTS

CN 102582073 A 7/2012

* cited by examiner

*Primary Examiner* — Sunita Joshi

(57) ABSTRACT

An ear-worn hearing device and an electrical cable assembly for such a hearing device are disclosed. The electrical cable assembly includes a discrete retention member rotationally and axially fixing the retention member at least partially about an end portion of an electrical conductor conduit. The retention member also axially and rotationally fixes the cable assembly to a housing. The housing can include an acoustic receiver and be configured for insertion at least partially in the user's ear. Alternatively, the housing can be part of a connector plug that mates with a base unit worn outside the user's ear.

20 Claims, 8 Drawing Sheets

ELECTRICAL CABLE ASSEMBLY FOR EAR-WORN HEARING DEVICES

FIELD OF THE DISCLOSURE

The present disclosure relates generally to hearing devices and more particularly to ear-worn hearing devices comprising one or more components connectable to an electrical cable assembly, and to cable assemblies for such hearing devices.

BACKGROUND

Some ear-worn hearing devices comprise multiple components interconnected by an electrical cable assembly comprising an electrical cable and a connector. One such hearing device is a receiver-in-canal (RIC) type behind-the-ear (BTE) hearing aid comprising a BTE unit worn against the backside of a user's ear and a RIC unit configured for at least partial insertion in the user's ear canal. The BTE unit contains one or more microphones, electrical circuits and batteries for converting sensed environmental sounds into amplified electrical audio signals. The RIC unit includes a balanced armature receiver (also referred to herein as a "transducer") for converting the electrical audio signals to sound that is emitted into the user's ear. In some hearing devices, the receiver is contained within a housing having an ear-dome worn at least partially in the user's ear. One end of the electrical cable assembly includes a connector releasably connected mechanically and electrically to the BTE unit. Another end of the electrical cable assembly is fixed to the receiver housing and wires running through an electrical conductor conduit of the electrical cable assembly are electrically connected to one or more terminals of the receiver. The end portion of the electrical cable assembly connected to the receiver housing comprises a stopper over-molded onto the electrical conductor conduit of the electrical cable assembly and retained in a cavity of the housing to axially and rotationally fix the cable assembly relative to the receiver housing. However, the over-molding process is labor intensive and expensive. There is need for improved ear-worn hearing device cable designs.

BRIEF DESCRIPTION OF THE DRAWINGS

The objects, features and advantages of the present disclosure will become more fully apparent from the following detailed description and the appended claims considered in conjunction with the accompanying drawings. The drawings depict only representative embodiments and are therefore not considered to limit the scope of the disclosure.

Those of ordinary skill in the art will appreciate that the figures are illustrated for simplicity and clarity and therefore may not be drawn to scale and may not include well-known features, that the order of occurrence of actions or steps may be different than the order described or that some or all of the actions or steps may be performed concurrently unless specified otherwise, and that the terms and expressions used herein have meanings understood by those of ordinary skill in the art except where different meanings are attributed to them herein.

DETAILED DESCRIPTION

The disclosure relates generally to ear-worn hearing devices comprising an in-ear hearing unit connectable to a base unit by an electrical cable assembly, cable assemblies for such hearing devices, and combinations thereof. The in-ear hearing unit (also referred to herein as an "in-ear unit") can be configured as Receiver-in-Canal (RIC) unit that fits at least partially in a user's ear canal, among other hearing device components. The base unit can be configured as a behind-the-ear (BTE) unit that drapes over or sits behind the user's ear, among other hearing device base components.

Figure 1:
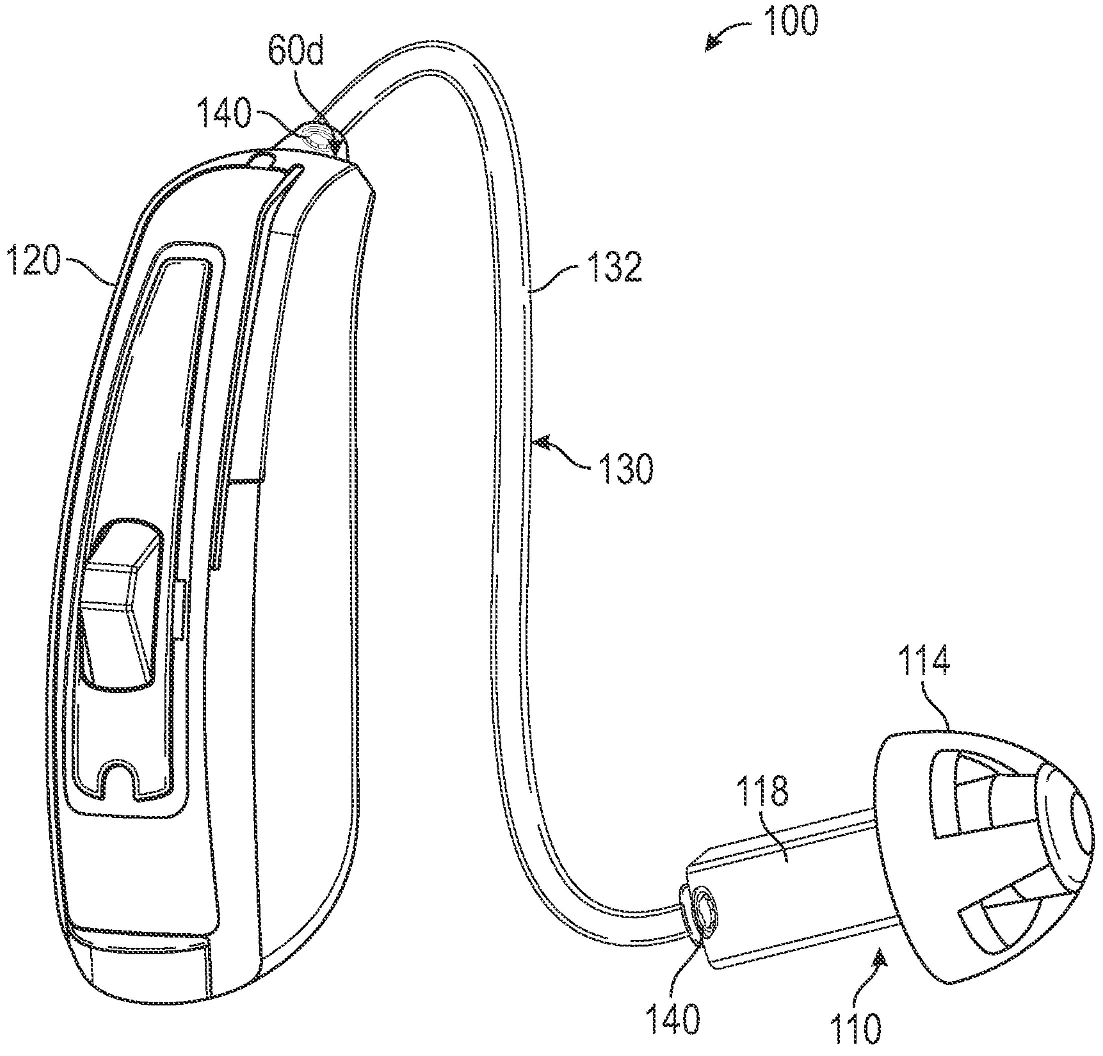
FIG. 1 illustrates an ear-worn hearing device comprising an in-ear unit and a base unit.
Figure 2:
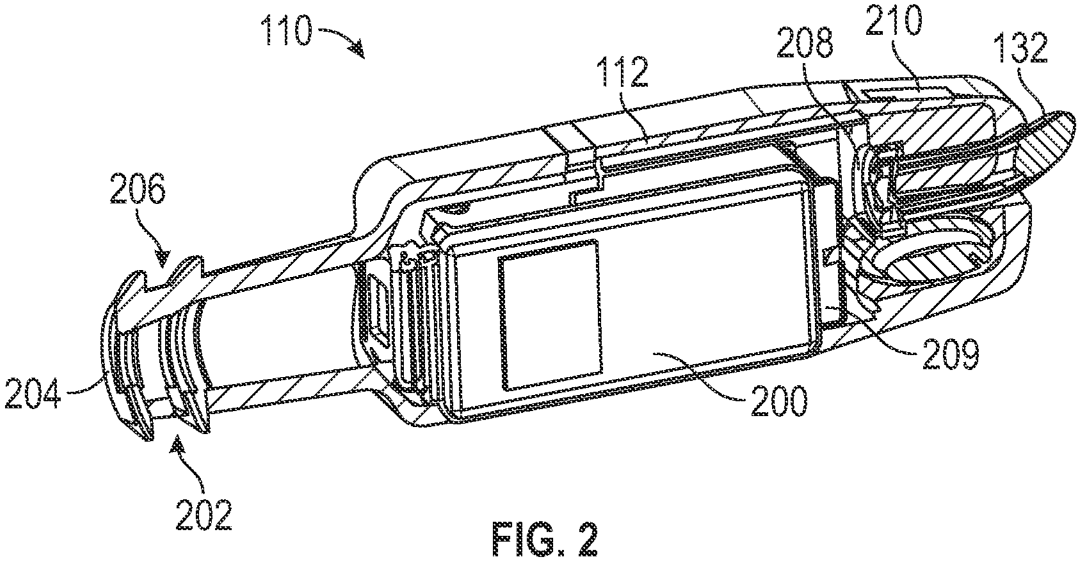
FIG. 2 is a cross-section view of the in-ear unit shown in FIG. 1.

Referring to FIGS. 1-2, a representative car-worn hearing device 100 generally comprises a RIC unit 110 comprising an acoustic transducer 200 disposed in a housing 112 having a nozzle 202 coupled to a resilient car dome 114 configured for insertion at least partially in a user's ear canal. In FIG. 2, the acoustic transducer 200 (also referred to as an acoustic receiver) is disposed in the RIC housing 112. The acoustic transducer can be embodied as one or more balanced armature receivers or dynamic speakers or a combination thereof. The acoustic transducer comprises a motor-actuated diaphragm that emits sound in response to electrical excitation signals conveyed by the electrical cable assembly.

In FIG. 1, the representative hearing device also comprises a BTE unit 120 configured for wear on a backside of a user's ear. The BTE unit generally comprises one or more microphones, an audio signal processor and batteries, among other circuits and sensors. In FIG. 1, an electrical cable assembly 130 mechanically and electrically interconnects the RIC and BTE units. The electrical cable assemblies described herein can also interconnect components of other hearing devices, referred to herein as a base unit and an in-car unit. More generally, the electrical cable assemblies described herein can be connected to electronic devices other than hearing devices.

The electrical cable assembly comprises an electrical conductor conduit configured to extend between a base unit worn outside a user's ear and an in-car unit at least partially inserted in the user's ear canal. In FIG. 1, the electrical cable assembly 130 comprises an electrical conductor conduit 132 configured to extend between a BTE unit 120 worn outside a user's ear and a RIC unit 110 least partially inserted in the user's ear canal. The electrical cable assembly can have other configurations for other applications. The electrical cable assembly can be a flexible member or it can have a relatively rigid preformed shape.

Figure 9:
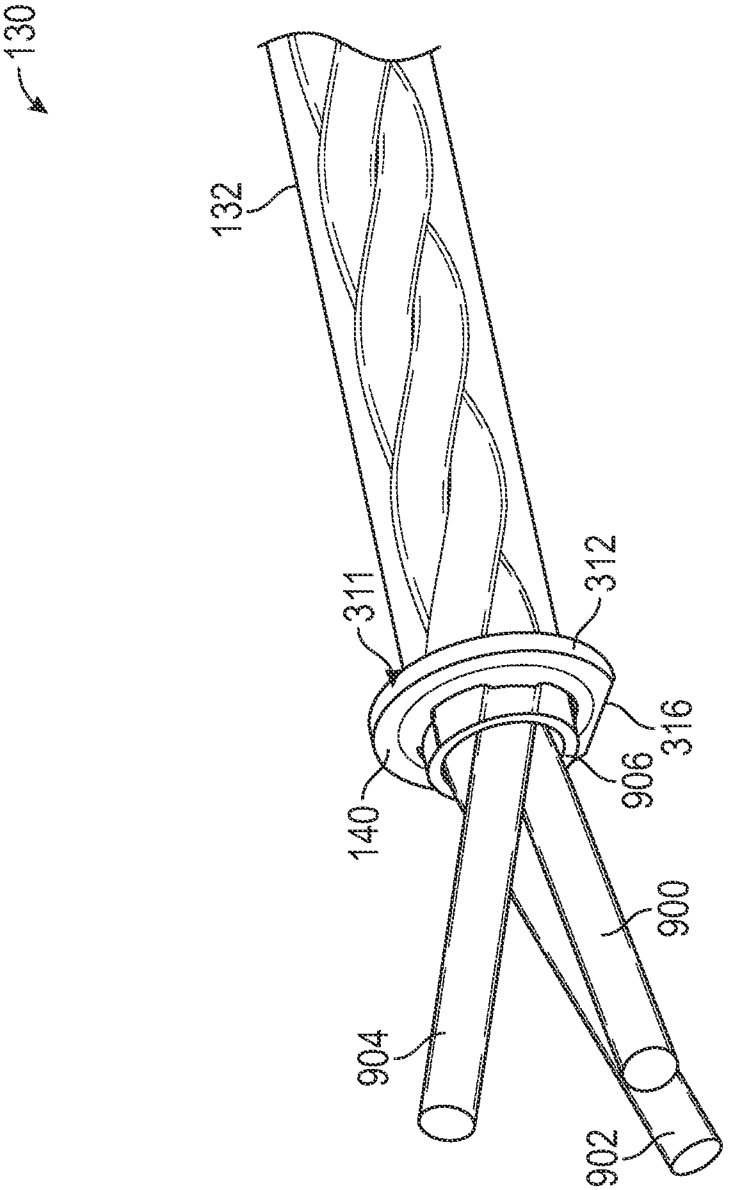

The electrical cable assembly also comprises one or more electrical conductors disposed within the electrical conductor conduit. The electrical conductors can be multi-strand litz wires or other suitable electrical conductors. In FIG. 9, the electrical cable assembly comprises one or more electrical conductors (e.g., electrical wires) 900, 902, 904 disposed within the electrical conductor conduit 132. The multiple wires can be protected by an insulated layer 906, such as a plastic sheath. In one implementation, the electrical conductor conduit is a hollow tube or sheath and the electrical conductors are disposed within the tube or sheath to form an electrical cable. In FIG. 2, the electrical wires of the electrical cable assembly are connected to contacts 209 electrically connected to the acoustic transducer 200 disposed in the housing 112. Alternatively, the electrical cable can be formed by extruding the electrical conductors within the electrical conductor conduit in an extrusion process. In some implementations, an additional stiffening member, such as a Kevlar wire, can be included within the electrical conductor conduit if desired. However, it will be recognized that other types of electrical conductors and electrical conductor conduits may be employed that are not shape-retaining.

The electrical cable assembly also comprises a discrete retention member is rotationally and axially fastened about an end portion of the electrical conductor conduit. The discrete retention member comprises a peripheral portion extending outwardly from an axial dimension of the electrical conductor conduit beyond a diameter of the electrical conductor conduit. For example, a diameter of the discrete retention member can be greater than a diameter of the electrical conductor conduit. More generally, one or more outer peripheral portions of the retention member can extend beyond the diameter of the conductor conduit. The discrete retention member is configured for disposal and retention in a housing receptacle of the car-worn hearing device. The discrete retention member is configured to prevent rotation and axial displacement of the electrical conductor conduit relative to the housing as described further herein. A discrete retention member can be located at one or both ends of the electrical conductor conduit for connecting to an in-car unit, a base unit, or both as described further herein.

Figure 7:
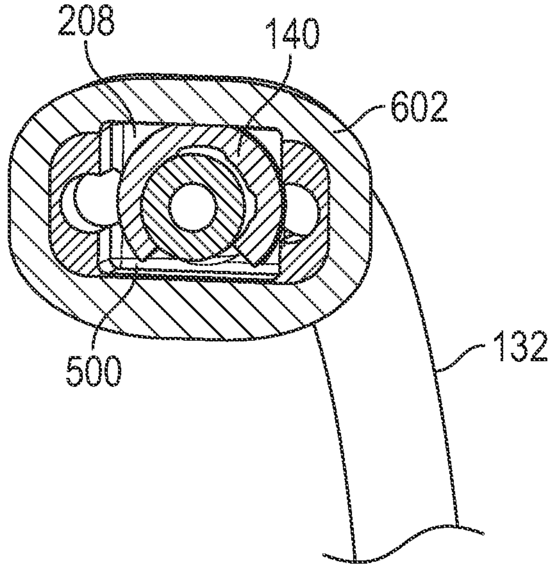
FIG. 7 is a cross-section view of the base unit cable connector shown in FIG. 6.
Figure 8:
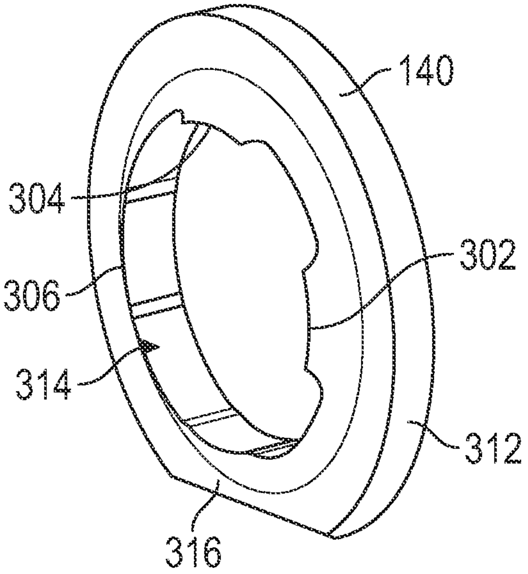
FIGS. 8-11 illustrate representative discrete retention members and assembly with end portions of electrical conductor conduits.

The discrete retention member can be any suitable shape and can be assembled radially or axially with the electrical conductor conduit, depending on the configuration of the retention member. In one implementation, the discrete retention member is a ring-shaped member. In FIGS. 3-5 and 7, the discrete retention member is a c-ring assembled radially with the electrical conductor conduit via an opening on the c-ring as described further herein. In FIGS. 8-10, the discrete retention member comprises a closed-ring assembled axially with the conductor conduit. In FIG. 11, the discrete retention member comprises a radial flange extending from a slotted sleeve with a longitudinal dimension. Alternatively, the sleeve of FIG. 11 can be devoid of the slot. In other implementations, the sleeve, with or without the slot, can be devoid of the radial flange. However, other suitably shaped discrete retention members may also be employed. The discrete retention member can be stamped from metal sheet stock, formed from wire stock, or form in a casting, molding or other operation. The discrete retention member can be fastened to the conductor conduit by teeth, crimp, interference fit, heat-stake, ultrasonic stake or other suitable fastening mechanism. Representative examples are described further herein.

Figure 3:
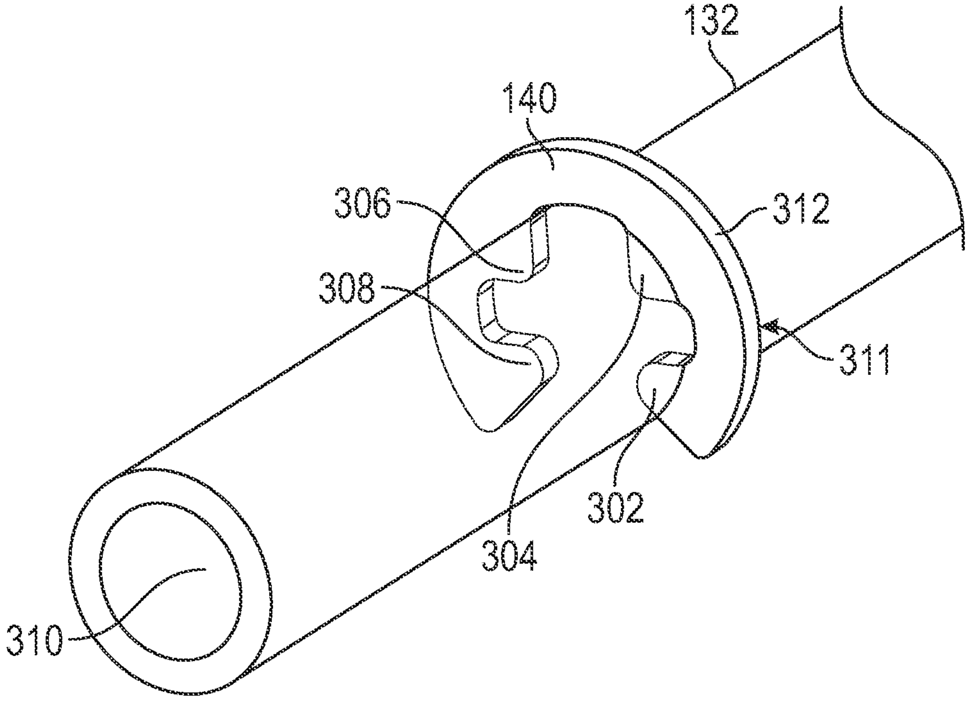
FIG. 3 is a representative discrete retention member fastened to an end portion of an electrical conductor conduit.
Figure 4A:
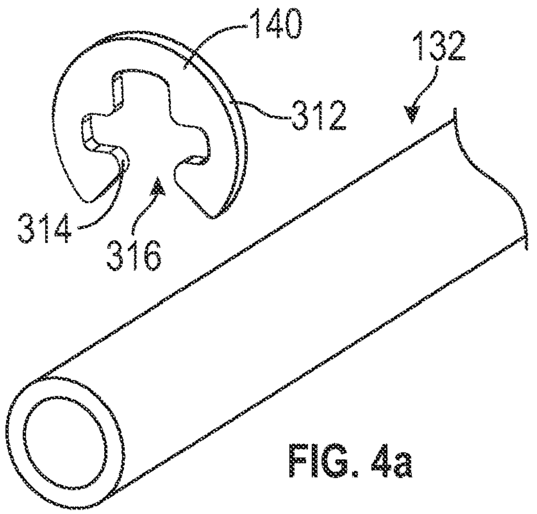
FIG. 4*a*-FIG. 4*c* illustrate a representative assembly operation for attaching a discrete retention member to an electrical conductor conduit.

In some implementations, the discrete retention member comprises one or more teeth that bite into an outer portion of the electrical conductor conduit. In FIG. 3, an inner portion of the c-ring 140 comprises one or more teeth 302-308 that bite (e.g., cut) into an outer portion 310 of the electrical conductor conduit 132. In FIG. 4*a*, the teeth protrude from an inner portion 314 of the discrete retention member 140. The one or more teeth axially and rotationally fasten or fix the discrete retention member about the electrical conductor conduit. In FIG. 3, the teeth may prevent the c-ring from being axially assembled with the electrical conductor conduit. In FIG. 8, an inner portion of the closed-ring 140 comprises three teeth 302-306 protruding from an inner portion 314 of the ring-shaped member for biting into an outer portion of the electrical conductor conduit as show in FIG. 9. It will be recognized that any suitable number of protrusions or teeth and any suitable configuration of protrusions can be employed. For example, the teeth can have a pointed tip or a sharp symmetrical or asymmetrical edge. In some implementations the one or more teeth are arranged asymmetrically about a planar dimension of the ring-shaped member, as shown in FIGS. 8-10. The asymmetry can facilitate axial assembly of the retention member with the electrical conductor conduit. Asymmetrically arranged teeth can be formed by a stamping or molding operation or result from a secondary forming operation.

Figure 4B:
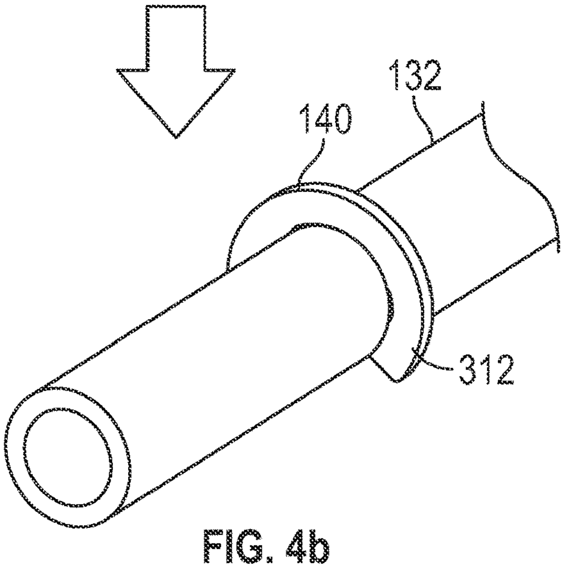
Figure 4C:
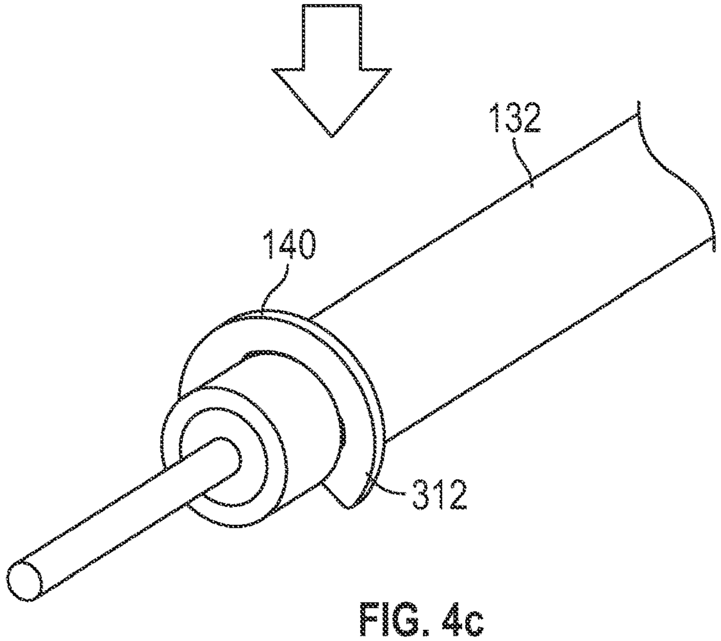

In FIG. 4*a*, an open end of the c-ring 140 is pressed over the electrical conductor conduit 132 some distance from the bitter end. The c-ring shaped member can be flexible so that the opening expands when the retention member is pressed about the electrical conductor conduit. Alternatively, c-shaped retention member can be relatively rigid so that it cuts into the electrical conductor conduit. In FIG. 4*b*, the c-ring is axially and rotationally fixed about the electrical conductor conduit 132 by teeth that cut into the conductor conduit 132. Optionally, glue can also be applied to better secure the discrete retention member to the electrical conductor conduit. In FIG. 4*c*, sections of the electrical conductor conduit and coating of the wire have been removed to expose the conductive portion of the wire for electrical attachment to the terminals of the transducer. Such removal can be performed in a cutting or stripping operation.

Generally, a housing of the car-worn hearing device comprises a retention member receptacle in which the discrete retention member is disposed and retained. A portion of the electrical conductor conduit can extend through an aperture between the receptacle and an exterior or the housing. The housing can be an in-ear housing comprising an acoustic receiver. Alternatively, the housing can be a portion of an electrical connector plug connectable to a base unit. In FIG. 2, the housing 112 of the car-worn hearing device 100 has an opening 204 in a sound output end portion 206 of the housing 112 and a retention member receptacle 208 in a cavity of the housing on an opposing end 210 of the housing. The retention member receptacle 208 receives the discrete retention member fastened to the electrical conductor conduit and a portion 132 of the conductor conduit extends through a housing aperture leading to the receptacle. Interaction between a portion of the discrete retention member and the receptacle prevents axial and in some implementations rotational displacement of the electrical conductor conduit relative to the housing as described herein. A similar retention member receptacle can also be located in a connector housing of an electrical connector plug, shown in FIGS. 6 and 7, connectable with the base unit.

In implementations where both ends of the electrical conductor conduit comprise a discrete retention member disposed in a corresponding housing receptacles, the retention member can prevent axial separation of the electrical conductor conduit from both housings. The retention members can also prevent rotation of the conductor conduits relative to both housings. In some implementations, one of the discrete retention members permits rotation of the electrical conductor conduit relative to one housing and the other discrete retention member prevents rotation relative to the other housing. Such rotation may be desirable to provide a fit more specifically tailored to a user's unique anatomy.

Figure 5:
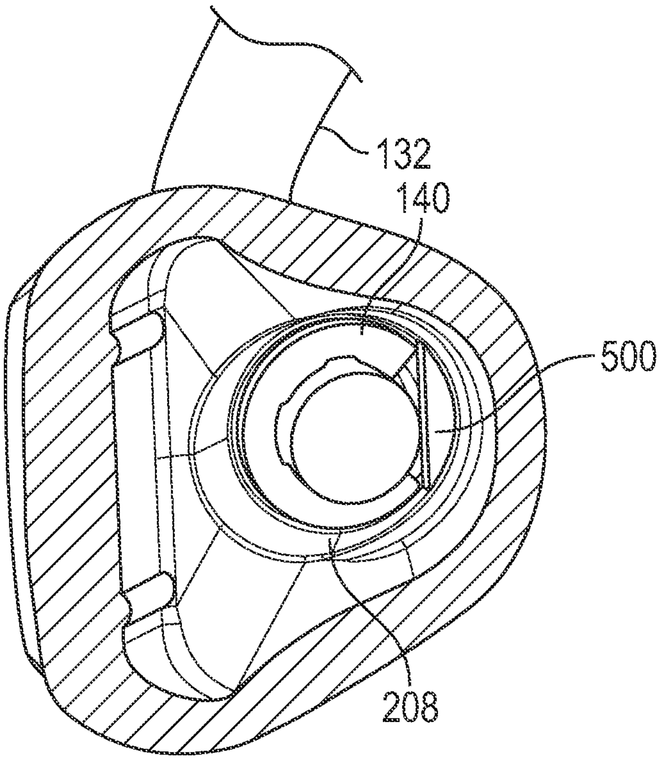
FIG. 5 is a cross-section view of an end portion of an in-ear acoustic receiver shown in FIG. 2 that retains the discrete retention member.
Figure 6:
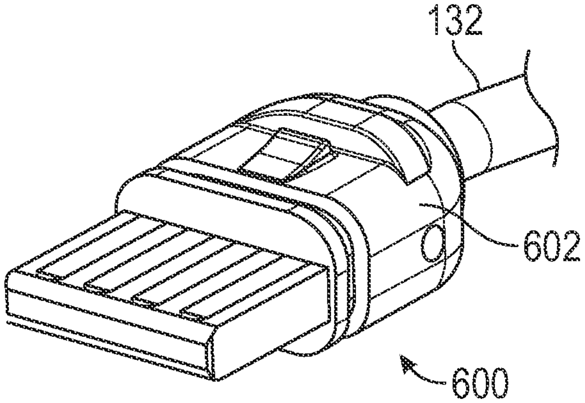
FIG. 6 illustrates a representative base unit cable connector.

FIG. 5 is a cross-section view of an end portion of an in-ear acoustic receiver shown in FIG. 2 that retains the discrete retention member. In FIG. 5, the retention member receptacle 208 comprises a flat portion 500 that contacts a non-circular peripheral portion of the c-ring 140 to prevent rotation. The c-ring 140 also prevents axial extraction of the electrical conductor conduit 132 from the housing. FIG. 6 illustrates a representative base unit cable connector 600 for connection to a base unit. The connector comprises a housing 602 to which the electrical conductor conduit 132 is connected. FIG. 7 is a cross-sectional view of the cable connector 600 of FIG. 6. In FIG. 7, a c-ring 140 is fastened to the electrical conductor conduit 132 as described herein. The c-ring is seated in a receptacle 208 of the housing 602 and a non-circular open portion of the c-ring contacts a flat portion 500 of the receptacle 208 to prevent rotation. The c-ring 140 also prevents axial extraction of the electrical conductor conduit 132 from the housing 602. In FIGS. 8-9, the closed ring retention member 140 comprises a flat portion 316 configured to seat adjacent a flat portion of the retention member receptacle, for example, the flat portion 500 of the receptacle 208 in FIGS. 5 and 7.

Figures 10A, 10B:
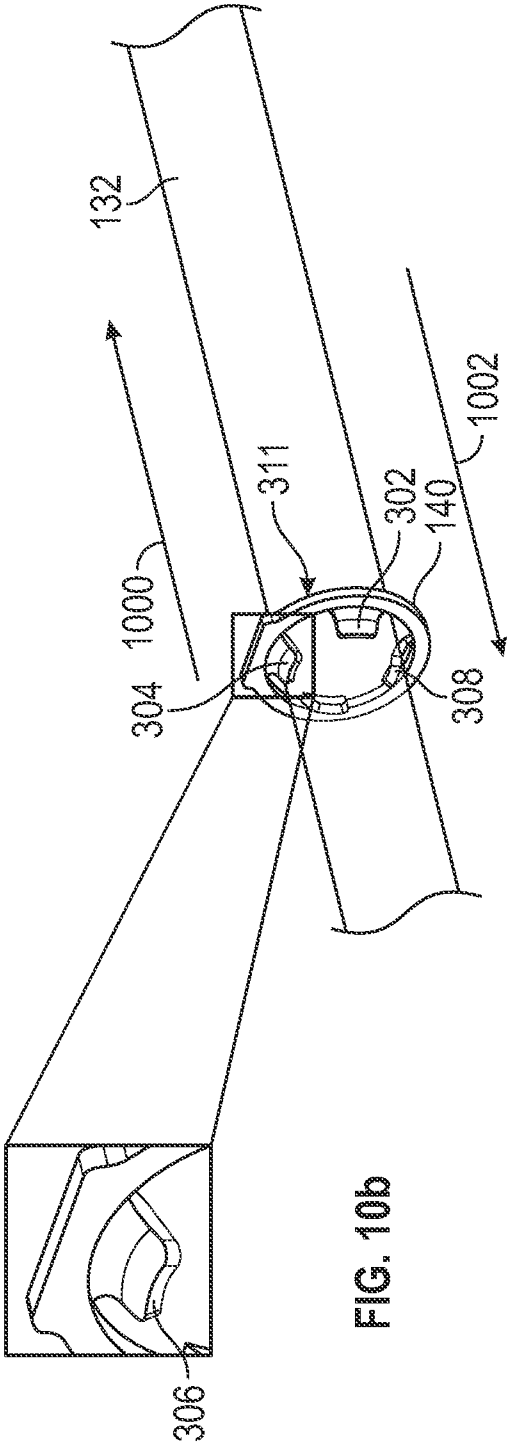
Figure 11:
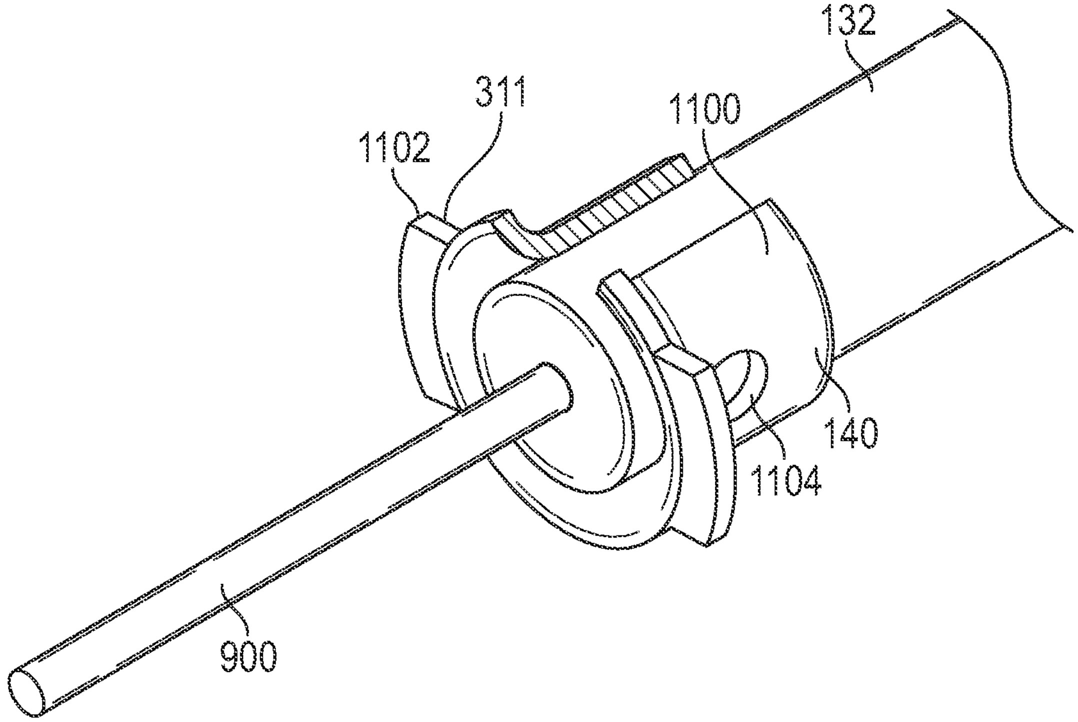

FIG. 10*a* illustrates a closed-ring retention member 140 fastened to an end portion of an electrical conductor conduit 132. FIG. 10*b* is an enlarged section view of the discrete retention member shown in FIG. 10*a*. The asymmetrical configuration of the bent or flared teeth 302, 304, 308 facilitate axially assembly of the closed-ring with the conductor conduit 132 in one direction 1000. A force applied to the retention member in the direction 1002 causes the teeth to bite into the conduit 132 thereby preventing axial displacement relative to the conductor conduit. When the discrete retention member is disposed in a housing receptacle, the electrical conductor conduit 132 cannot be axially displaced in the direction 1000. A wall of the housing receptacle against which an end of the conductor conduit 132 abuts can prevent displacement of the conductor conduit in the direction 1002. The closed-ring retention members comprising flared teeth in FIGS. 8 and 9 can function similarly.

In FIG. 11, the discrete retention member 140 comprises an elongated sleeve 1100 with a slot that can be axially or radially assembled with the conductor conduit 132. The discrete retention member also comprises one or more flanges 1102 extending radially from the sleeve 1100. Alternatively the sleeve can be devoid of the slot. These and other discrete retention member configurations can be fastened about the electrical conductor conduit by a crimp, spring-force of the slotted sleeve, or by other fastening mechanisms described herein. The sleeve can also comprise teeth on an interior of the collar that bite into an outer portion of the electrical conductor conduit. The crimping operation can also form the outer peripheral portion (e.g., a flat surface) of the discrete retention member that prevents rotation of the retention member in the housing receptacle.

In FIG. 11, the sleeve 1100 with or without the slot can also exclude the flange 1102. Such a flangeless sleeve portion can have sufficient radial thickness to prevent axial displacement of the electrical conductor conduit relative to the housing through interaction with the housing receptacle. In this implementation, the portion extending outwardly from an axial dimension of the electrical conductor conduit corresponds to the thickness dimension of the sleeve. In implementations where the sleeve is fastened to the electrical conductor conduit by a crimp, the outer peripheral portion of the sleeve can comprise a crimp deformation. The deformation can be a flat or other surface defined by the structure of the crimping tool. The crimp deformation can abut a portion of the retention member receptacle to prevent rotation of the electrical conductor conduit. If desired, a retention hole 1104 is in the collar to receive a portion of the sleeve as a result of the crimping operation.

While the disclosure and what is presently considered to be the best mode thereof has been described in a manner establishing possession and enabling those of ordinary skill in the art to make and use the same, it will be understood and appreciated that there are many equivalents to the representative embodiments described herein and that myriad modifications and variations may be made thereto without departing from the scope and spirit of the invention, which is to be limited not by the embodiments described but by the appended claims and their equivalents.

What is claimed is:

1. An ear-worn hearing device electrical cable assembly comprising:

an electrical conductor conduit configured to extend between a base unit worn outside a user's ear canal and an acoustic receiver disposed at least partially in the user's ear canal; and a discrete retention member disposed at least partially about an end portion of the electrical conductor conduit, the discrete retention member rotationally and axially fixed to the electrical conductor conduit and comprising an outer peripheral portion engageable with a surface of a retention member receptacle in either the base unit or the acoustic receiver, that rotationally and axially fixes the electrical conductor conduit relative to either the base unit or the acoustic receiver, the discrete retention member comprising an outer peripheral portion extending outwardly beyond a diameter of the electrical conductor conduit.

2. The ear-worn hearing device electrical cable assembly of claim 1 further comprising one or more electrical conductors disposed within the electrical conductor conduit, the one or more electrical conductors each comprising a multi-strand litz wire.

3. The ear-worn hearing device electrical cable assembly of claim 1, wherein the discrete retention member comprises one or more teeth that bite into an outer portion of the electrical conductor conduit.

4. The ear-worn hearing device electrical cable assembly of claim 3, wherein the retention member comprises a ring-shaped member having an inner radial portion from which the one or more teeth protrude.

5. The ear-worn hearing device electrical cable assembly of claim 4, wherein the ring-shaped member is a c-ring.

6. The ear-worn hearing device electrical cable assembly of claim 4, wherein the one or more teeth are flared outwardly from a planar dimension of the ring-shaped member.

7. The ear-worn hearing device electrical cable assembly of claim 1, wherein the discrete retention member comprises a flange extending radially from a sleeve axially and rotationally fastened about the electrical conductor assembly.

8. The ear-worn hearing device electrical cable assembly of claim 7, wherein the sleeve is crimped about the electrical conductor conduit.

9. The ear-worn hearing device electrical cable assembly of claim 7, wherein the sleeve comprises teeth that bite into an outer portion of the electrical conductor conduit.

10. The ear-worn hearing device electrical cable assembly of claim 2, wherein the discrete retention member comprises a sleeve fastened about the electrical conductor conduit by a crimp, wherein the outer peripheral portion of the discrete retention member comprises a crimp deformation.

11. The ear-worn hearing device electrical cable assembly of claim 10, wherein the sleeve has a longitudinal dimension and is devoid of a radial flange.

12. An ear-worn hearing device subassembly comprising:
- a housing comprising a retention member receptacle;
- an electrical conductor conduit comprising at least one electrical conductor; and
- a discrete retention member rotationally and axially fastened about the electrical conductor conduit,
- the discrete retention member disposed and retained in the retention member receptacle of the housing, the discrete retention member comprising an outer peripheral portion engageable with a surface of the retention member receptacle to rotationally and axially fix the electrical conductor conduit relative to the housing.

13. The ear-worn hearing device subassembly of claim 12 wherein the discrete retention member comprises one or more teeth that bite into an outer portion of the electrical conductor conduit to rotationally and axially fasten the discrete retention member to the electrical conductor conduit.

14. The ear-worn hearing device subassembly of claim 13, wherein the retention member comprises a ring-shaped member having an inner radial portion from which the one or more teeth extend, the ring-shaped member comprising an outer peripheral portion engageable with a portion of the retention member receptacle to rotationally and axially fix the electrical conductor conduit relative to the housing.

15. The ear-worn hearing device subassembly of claim 14, wherein the ring-shaped member is a c-ring.

16. The ear-worn hearing device subassembly of claim 14, wherein the ring-shaped member is a closed-ring and the one or more teeth flare outwardly from a planar dimension of the ring-shaped member.

17. The ear-worn hearing device subassembly of claim 12, wherein the discrete retention member comprises a sleeve fastened about the electrical conductor conduit by a crimp.

18. The ear-worn hearing device subassembly of claim 17, wherein the sleeve comprises a crimp deformation abutting a portion of the retention member receptacle.

19. The ear-worn hearing device subassembly of claim 12, wherein the housing comprises an in-ear housing configured for insertion at least partially in a user's ear and an acoustic transducer at least partially disposed in the in-ear housing, the electrical conductor electrically connected to the transducer.

20. An ear-worn hearing device electrical cable assembly comprising:
- an electrical conductor conduit configured to extend between a base unit worn outside a user's ear canal and an acoustic receiver disposed at least partially in the user's ear canal; and
- a discrete retention member disposed at least partially about an end portion of the electrical conductor conduit, the discrete retention member rotationally and axially fixed to the electrical conductor conduit,
- the discrete retention member comprising a c-ring shaped member comprising an outer peripheral portion extending outwardly beyond a diameter of the electrical conductor conduit and comprising one or more teeth that bite into an outer portion of the electrical conductor conduit, the c-ring shaped member having an inner radial portion from which the one or more teeth protrude.

* * * * *